W. H. HAYLOCK.
SAD IRON HEATER.

No. 181,937.  Patented Sept. 5, 1876.

WITNESSES:
Chas. Nida
John Goethals

INVENTOR:
W. H. Haylock
BY
ATTORNEYS.

UNITED STATES PATENT OFFICE.

WILLIAM H. HAYLOCK, OF JONESVILLE, ASSIGNOR TO HIMSELF AND CHARLES S. PIERSON, OF SANDY HILL, NEW YORK.

IMPROVEMENT IN SAD-IRON HEATERS.

Specification forming part of Letters Patent No. 181,937, dated September 5, 1876; application filed March 25, 1876.

*To all whom it may concern:*

Figure 1:
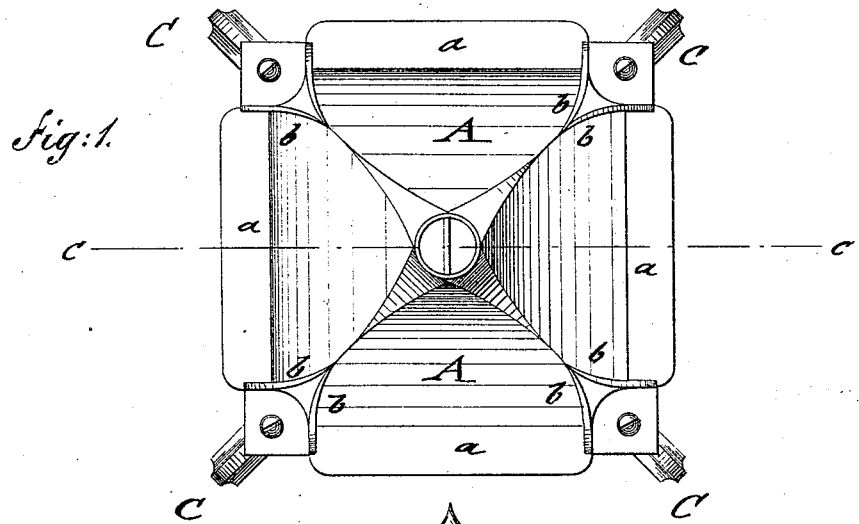
Figure 2:
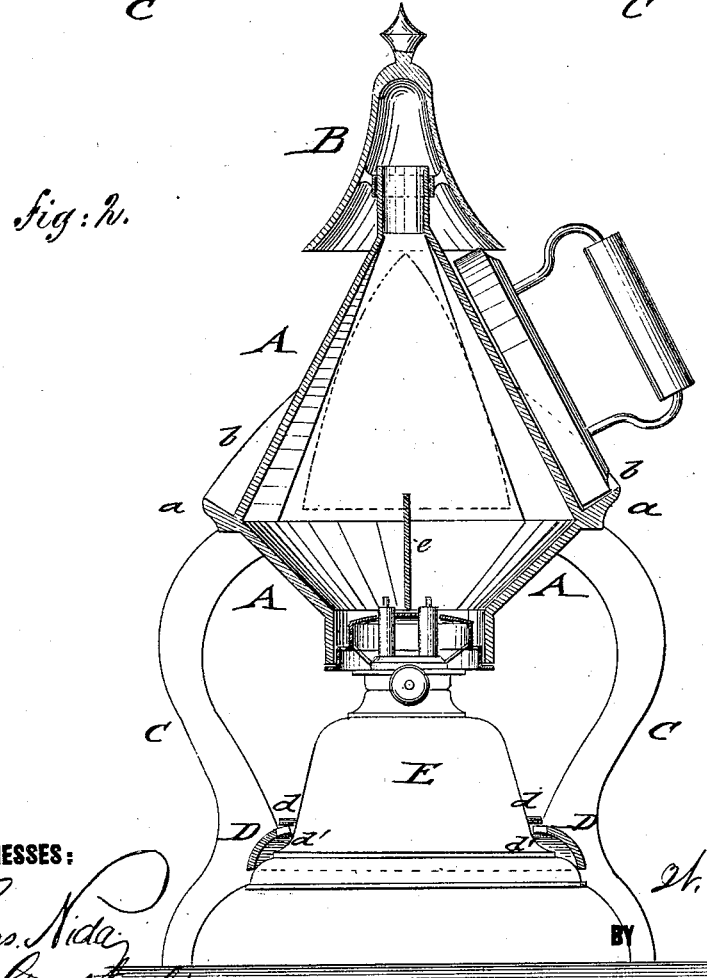

Be it known that I, WILLIAM H. HAYLOCK, of Jonesville, in the county of Saratoga and State of New York, have invented a new and Improved Sad-Iron Heater, of which the following is a specification:

In the accompanying drawing, Figure 1 represents a top view of my improved sad-iron heater, with cap removed; and Fig. 2 is a vertical central section of the same on line $c\,c$, Fig. 1.

Similar letters of reference indicate corresponding parts.

The invention consists in combining in a sad-iron heater a lamp, having diametrically-opposite pins, with a ring of leg-frame; also, the burner, provided with a partition, so that each flame will have its own separate draft or current of air.

In the drawing, A represents a metallic chimney for kerosene-lamps, that is set upon the lamp in the same manner as any ordinary glass chimney. The air enters to the flame directly below the chimney, and the heat escapes at the top orifice, where it is controlled, reflected, and economized by a bell-shaped cap, B. The chimney A bulges from its lower cylindrical part outwardly into pyramidal shape, and has at the bottom edge of the faces or sides, ledges $a$ and side flanges $b$, to support, in connection with the cap-piece, the sad-irons placed thereon for heating. The lamp and chimney are supported on a leg-frame, C, with a lower ring, D, for the lamp E, the legs being attached to the corners of the pyramidal part of the chimney, and the ring to lugs or seats of the legs. The lamp E has projecting pins $d$ at diametrically-opposite points, which rest on the top of the ring, but which pass through recesses $d'$ of the ring when the lamp is desired to be taken out for refilling. The lamp is preferably made with two wicks, to increase the heating capacity, the wicks being separated by a partition-plate, $e$, by which a supply of air is furnished to each flame. As the draft is direct, the flames burn clearly, without smoke or odor; nor is there a possibility of heating up the lamp, which forms an essential point of advantage in my heater. The irons are applied and taken off in very convenient manner, being heated for use in short time, the cap serving to radiate the heat evenly over the whole surface of the heating-faces.

Having thus described my invention, what I claim as new, and desire to secure by Letters Patent, is—

1. The lamp E, having diametrically-opposite pins $d$, in combination with a leg-frame, C, having the ring D, as and for the purpose set forth.

2. In a sad-iron heater, the burner, made with two wick-tubes, separated by a partition, $e$, whereby each flame, having its own current of air, will burn more freely and be less liable to smoke.

WILLIAM H. HAYLOCK.

Witnesses:
MOSES SMITH,
ZEPHANIAH H. VINCENT,
D. M. NORTHRUP.